Nov. 14, 1961 F. SCHRÖTER 3,008,794
APPARATUS FOR STORING INTELLIGENCE SIGNALS
Filed July 9, 1959
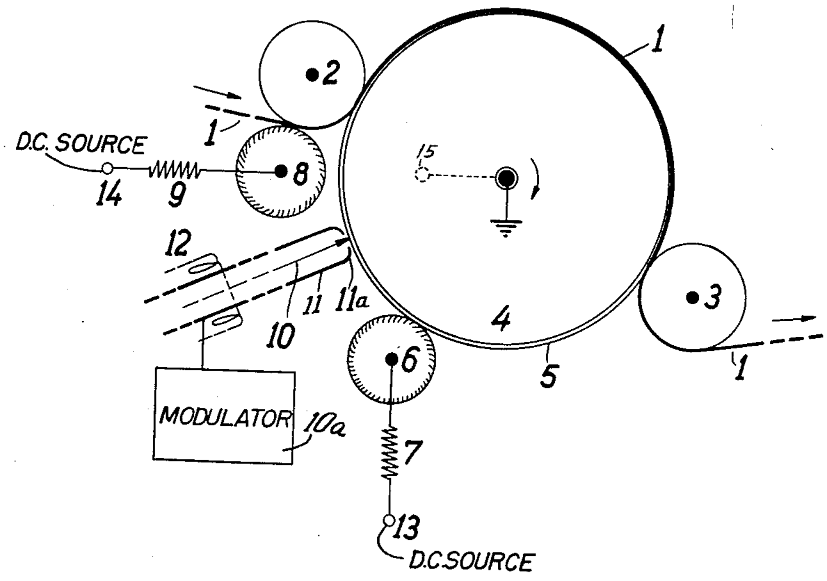
Inventor:
Fritz Schröter
By [signature]
Patent Agent United States Patent Office 3,008,794

Patented Nov. 14, 1961

3,008,794

APPARATUS FOR STORING INTELLIGENCE SIGNALS

Fritz Schröter, Neu-Ulm, Danube, Germany, assignor to Telefunken G.m.b.H., Berlin, Germany Filed July 9, 1959, Ser. No. 825,995

Claims priority, application Germany July 12, 1958

10 Claims. (Cl. 346—74)

The present invention relates to an apparatus for storing intelligence signals, particularly video signals of TV programs or the like.

Electrostatic recording and storing methods have been known in the art. These known methods generally operate as follows: The intelligence signals are deposited on an insulating storage tape in the form of electrical charges. The tape then is powdered with finely divided particles carrying the opposite charge, said particles then adhering by attraction to the charged areas of the tape, whereby a visible image is produced. Furthermore, it has been known to finally fix the adhering dust on the tape so that, upon subsequent optical scanning of the dust pattern, the intelligence can be reproduced as originally deposited on the tape. When pictures are used as intelligence signals, the medium brightness and variation thereof is obtained by varying the charge, i.e., the dust density. A superior method is to vary the fraction of the area of each image spot actually covered by dust.

Furthermore, it has been known in the art to "write" intelligence signals on a tape in the form of lines across its width, the tape being moved lengthwise, whereby successive transverse lines are produced "written" thereon. Such tape is a storage tape and the signals fixed thereon can be subsequently reproduced.

If an electrostatic method as mentioned is used, the tape is made of insulating material. Other methods have been well known in the art, using magnetic or photographic films.

The invention is only concerned with the first-mentioned electrostatic method.

The main difficulties arising in practising electrostatic storage methods result from the extraordinarily short period of time, in the order of a magnitude of $10^{-7}$ sec., available for the impression of a single image video spot when, for example, $1/25$ sec. is the time for each frame according to European standards. When, as is the usual practice, one transverse line of a tape must store a complete TV picture line having 600 image spots, then the charge writing current, preferably a cathode ray modulated with the video signals, has to have a difficult-to-obtain magnitude or density which cannot be resolved with the required minute size of the image spot recorded. During the $10^{-7}$ sec. interval, there must be fed to the storage tape so great an amount of charge, that the capacity of every image spot on the insulating tape increases the voltage to several thousand volts, required by the electrostatically operating powdering method. The current requirements thus become too high and it is not possible to sharply register all of the image spots on a tape of reasonable width, because the effective electron spot produced by the cathode ray on the tape is already too broad.

In order to remedy this disadvantage, it has been proposed to first charge the storage tape uniformly up to several thousand volts and then to bring this tape into contact with a photoelectric-semi conductor. An image is produced on a fluorescent screen by a video signal modulated cathode ray, and the semi conductor is in optical contact with the fluorescing screen. However, here the difficulty is encountered that the photoelectric semi conductors presently known do not change their conductivity to a sufficient degree during $10^{-7}$ sec. Thus, extraordinarily strong light sources would be required which, in turn, means a very high cathode ray current impinging on the screen, so that the desired sharpness of every image spot cannot be obtained. However, the present day photoelectric semi conductor and screen materials do not lend themselves to this approach.

It is, therefore, an object of the present invention to provide a new and improved apparatus to electrostatically store intelligence signals.

It is another object of the invention to provide an apparatus capable of storing intelligence signals, particularly TV video signals, on a storage tape, wherein the original signal has a duration of about $10^{-7}$ sec.

It is a further object of the invention to provide an endless insulating layer having induced thereon a conductivity pattern which may represent images or TV pictures. The layer is applied to a suitable carrier. An insulating storage tape is brought into close contact with the insulating layer for a period of time long as compared with $10^{-7}$ sec., i.e., the time required to write one spot of the pattern on the layer. A uniform voltage is impressed between the carrier and the tape allowing a discharge current of various densities to flow through the layer carrying the conductivity pattern, whereby a charge pattern is impressed on the storage tape in conformity with the conductivity pattern. The layer, preferably, is mounted on a wheel or roll comprising the carrier and the moving tape is guided in firm contact with the rolling wheel, whereby no slippage is allowed. The tape, after having contact with the layer, is powdered and then permanently fixed, as known in the art.

Still further objects and the entire scope of applicability of the present invention will become apparent from the detailed description given hereinafter; it should be understood, however, that the detailed description and specific example, while indicating the preferred embodiment of the invention, is given by way of illustration only, since various changes and modifications within the spirit and scope of the invention will become apparent to those skilled in the art from this detailed description.

The drawing schematically shows an apparatus in accordance with the present invention. This apparatus is designed to store TV pictures, but is in understood that any kind of pictures, movies, or any other kind of intelligence signal may be stored equally well in accordance with the present invention.

Referring more specifically to the drawing, 1 designates an insulating storage tape guided by idlers 2 and 3 along a certain portion of the periphery of a rotating wheel 4. The tape 1 is subjected to tension and its movement is at a velocity substantially equal to the tangential velocity of the wheel 4. In other words, along the path of this periphery between the idlers 2 and 3, there is no appreciable peripheral motion of the tape relative to the moving wheel 4.

The wheel 4 is provided with a thin continuous coating or layer made of a special insulating material which can be made conductive upon impingement of high velocity electrons. This material may be calcium fluoride, for example, or cryolite, aluminum oxide, silicon monoxide, or others. These materials can be made conductive when, for example, a beam of high velocity electrons penetrates into the layers thereof, such as layer 5. When the electrons have a velocity of, for example, 10,000 electron volts, they may penetrate up to $1\mu$; this depends greatly on the material actually used. The local resistance of the material greatly decreases at the point of impingement almost without any delay, even if the density of the beam is very low. The high original resistivity is restored within a period of time which is long as compared with the critical time period of $10^{-7}$ sec. mentioned above. Thus, the material has a certain capability to store a signal induced by the impingement of electrons thereon, and the degree of reduction of the resistivity depends on the strength of the electron beam. Thus, a pattern imaged on a layer of such material represents the brightness distribution of a picture, such as a TV picture. Thus, the layer 5 of the wheel 4 has the just mentioned capability of storing signals "written" thereon by electron beams of various intensity.

The width of the wheel 4 and the layer 5 corresponds to the width of the tape 1. The conductive hub of the wheel 4 is grounded.

6 and 8 denote two rollers lightly engaging the layer 5 and the tape 1, respectively. The rollers 6 and 8 are connected to D.C. voltage sources 13 and 14, respectively, via very high series resistors 7 and 9, respectively. The peripheries of the rollers 6 and 8 may consist of soft material having good conductivity, as for example impregnated felt or metal fiber webs. If the entire device is exposed to air, the rollers 6 and 8 can be used as corona discharge electrodes connected to high voltage sources. These rollers charge the tape 1 and the layer 5, as will be explained below in greater detail. In the case of corona discharges, the rollers 6 and 8 need not engage the layer 5 and the tape 1, respectively. 10 is an electron cathode ray beam modulated in accordance with a video signal in any manner known in the art, such as by a modulator shown schematically at 10*a*. Coils 12 serve to deflect the beam 10 in accordance with a sawtooth voltage, whereby the ray 10 is guided in successive lines across the layer 5, i.e., perpendicularly to the plane of the drawing. If this device is not operated in a vacuum, as described, the cathode ray must be produced in a closed cathode ray tube 11 having a Lenard-type window 11*a* through which the ray can pass towards the outside. This window need only be a small slot, having approximately the length of one picture line, because the cathode ray is deflected always along the same line path. If the entire device is used in high vacuum, no special enclosure for the cathode ray generation and deflection means is needed and the tape 1 may enter and leave the vacuum chamber via successive pressure chambers.

The other stages passed by the tape 1, such as the powdering zone and the fixing zone, are omitted in the drawing, because they are not part of the invention, and it is understood that any conventional apparatus known per se may be used.

The operation of the apparatus as described is as follows:

Upon rotation of the wheel 4 in the direction of the curved arrow, the layer 5 obtains a suitable charge with respect to ground when passing over the charging roller 6. Thereafter, the charged layer 5 passes the cathode ray 10 and the latter impresses a conductivity pattern in the form of lines on the layer 5, corresponding to a succession of image lines. This is carried out by a 10,000 volt (or more) cathode ray acceleration and with a beam intensity of a few microamperes during $10^{-7}$ sec. per image spot. This is sufficient to produce an image which stays on the layer for a long time interval, as compared with $10^{-7}$ sec., because the induced conductivity remains fairly long on the layer and fades out only very slowly. The fading out period can extend over many seconds and can be predetermined by suitably selecting the thickness of the layer and the material thereof. The invention makes use of this characteristic by utilizing the stored conductivity pattern to affect the tape 1 over a longer contact interval. This is obtained by first charging the tape, moving it along with the straight arrows and against the charge roller 8, whereby the charge is high with respect to ground and is uniformly distributed on the surface of the tape which, subsequently, closely contacts the layer 5. This contact is direct and no relative slippage is permitted to occur between the layer 5 and the tape 1 during the contact interval. During this contact interval, the tape discharges into the wheel 4 through the layer 5 according to the particular conductivity pattern of the layer 5. When the tape 1 leaves the wheel 4 at the idler 3, it has received a negative image of the conductivity pattern impressed on the layer 5, said negative image being in the form of an electrostatic pattern. If the video signal modulating the cathode ray beam comes from a negative film, then the charge pattern on the tape 1 obtained with the above-described method forms a positive picture. This kind of reversal does not necessarily occur, for instance, if a particular light beam scanner is adjusted to scan negative pictures and to produce a positive output signal.

The operations to be performed on the tape after it leaves contact with the layer 5 are: powdering, removing of excess dust, fixing and reeling. However, these steps do not form a part of the present invention.

As can be seen from the drawing, the portion of the layer 5 once having been written upon by the cathode ray beam returns to the writing zone after it loses contact with the tape. The length of the path of the layer 5 from the idler 3 to the cathode ray beam 10, i.e., the circumference of the wheel 4, depends on the time in which the original conductivity is restored in the layer 5. Furthermore, the writing speed determines the wheel diameter, because this speed is to be adjusted to TV standards. Finally, the path of the layer 5 depends upon the capability of charging the roller 6 to influence any possible remaining residual conductivity.

Usually, the operation is carried out with similar charge potentials on the tape 1 and the layer 5 before the latter is modified by the conductivity pattern. However, in certain cases, it may be advantageous to charge the roller 6 higher than the roller 8.

The apparatus as described can also be operated in a different manner. The roller 8 may be omitted and the tape 1 may be grounded, while the wheel 4 is connected to a high negative voltage potential and the tape thus becomes charged from the wheel 4 through the conductivity pattern of the layer 5.

Finally, one can operate with a charge reversal by charging the tape 1 homogeneously with a negative voltage and by connecting the wheel 4 with a high positive voltage source, such as 15, or vice versa. In this case, the tape 1 will obtain an image which conforms with the image on the layer 5 but having a mixture of positive and negative charges, whereby the one charge polarity represents the bright image points, while the other charge polarity represents the darker image points. This is very advantageous when the tape is subsequently powdered with uniformly charged particles, because they either are attracted or repelled by the charges on the tape and the picture thus obtained is of very high contrast. The tape speed must equal exactly the tangential speed of the layer 5 to obtain an accurate and undisturbed coating during the electrostatic printing. This speed synchronism can be satisfactorily obtained with the means known in the art of electronic mechanical feedback control systems.

I claim:

1. In an apparatus for applying a charge pattern representing intelligence signals to a tape of insulating material, the combination which comprises: a moving endless conductive carrier having a peripheral layer of insulating material the conductivity of which can be varied by electron bombardment; tape feed means for bringing the tape into intimate contact with said layer and maintaining such contact along a first part of the periphery of the carrier; electron bombardment means modulated by said signals, and impinging a beam on said layer at a second part of said periphery to apply a pattern of different conductivity in the layer, and electrode means operatively associated with the tape and with said second part of the periphery ahead of said electron bombardment means to impress a homogeneous bias charge on the layer and the tape prior to application of the pattern of different conductivity, whereby a charge pattern representing the signals is applied to the tape.

2. In an apparatus for applying a charge pattern representing intelligence signals on a tape of insulating material, the combination which comprises: a rotating wheel, an insulating layer of material the conductivity of which can be varied by electron bombardment, said layer being mounted on the periphery of said wheel, cathode ray means modulated by said signals and disposed to bombard said layer to induce a conductivity pattern thereon, means to bring the tape into contact with said layer and maintain precise contact along a substantial arcuate portion thereof, and means to induce a constant bias voltage between said wheel and said tape prior to bringing them into mutual contact, whereby a charge pattern representing the signals is applied to the tape.

3. In apparatus according to claim 2, said last-mentioned means comprising means to impress a uniform charge on said tape before it contacts said layer, and means to ground said wheel.

4. Apparatus according to claim 3, comprising in addition means to impress a uniform charge on said layer after it has been in contact with said tape and before it reaches said cathode ray means.

5. In apparatus according to claim 2, said last-mentioned means comprising means to induce a constant bias on said tape charging the tape with one polarity and charging said wheel with the opposite polarity.

6. In apparatus according to claim 10, said insulating layer being made of calcium fluoride.

7. In apparatus according to claim 10, said insulating layer being made of cryolite.

8. In apparatus according to claim 10, said insulating layer being made of aluminum oxide.

9. In apparatus according to claim 10, said insulating layer being made of silicon oxide.

10. In apparatus according to claim 2, the residual variations in conductivity of said material induced by said electron bombardment persisting for an interval approximating the duration of the contact between the tape and said layer, and vanishing before said wheel completes its rotation.

References Cited in the file of this patent

UNITED STATES PATENTS

| | | |
|---|---|---|
| 2,716,048 | Young | Aug. 23, 1955 |
| 2,829,025 | Clemens et al. | Apr. 1, 1958 |
| 2,883,257 | Wehe | Apr. 21, 1959 |
| 2,898,468 | McNaney | Aug. 4, 1959 |
| 2,901,374 | Gundlach | Aug. 25, 1959 |